No. 785,353. PATENTED MAR. 21, 1905.
J. S. EBERT.
CLUTCH.
APPLICATION FILED JULY 6, 1904.
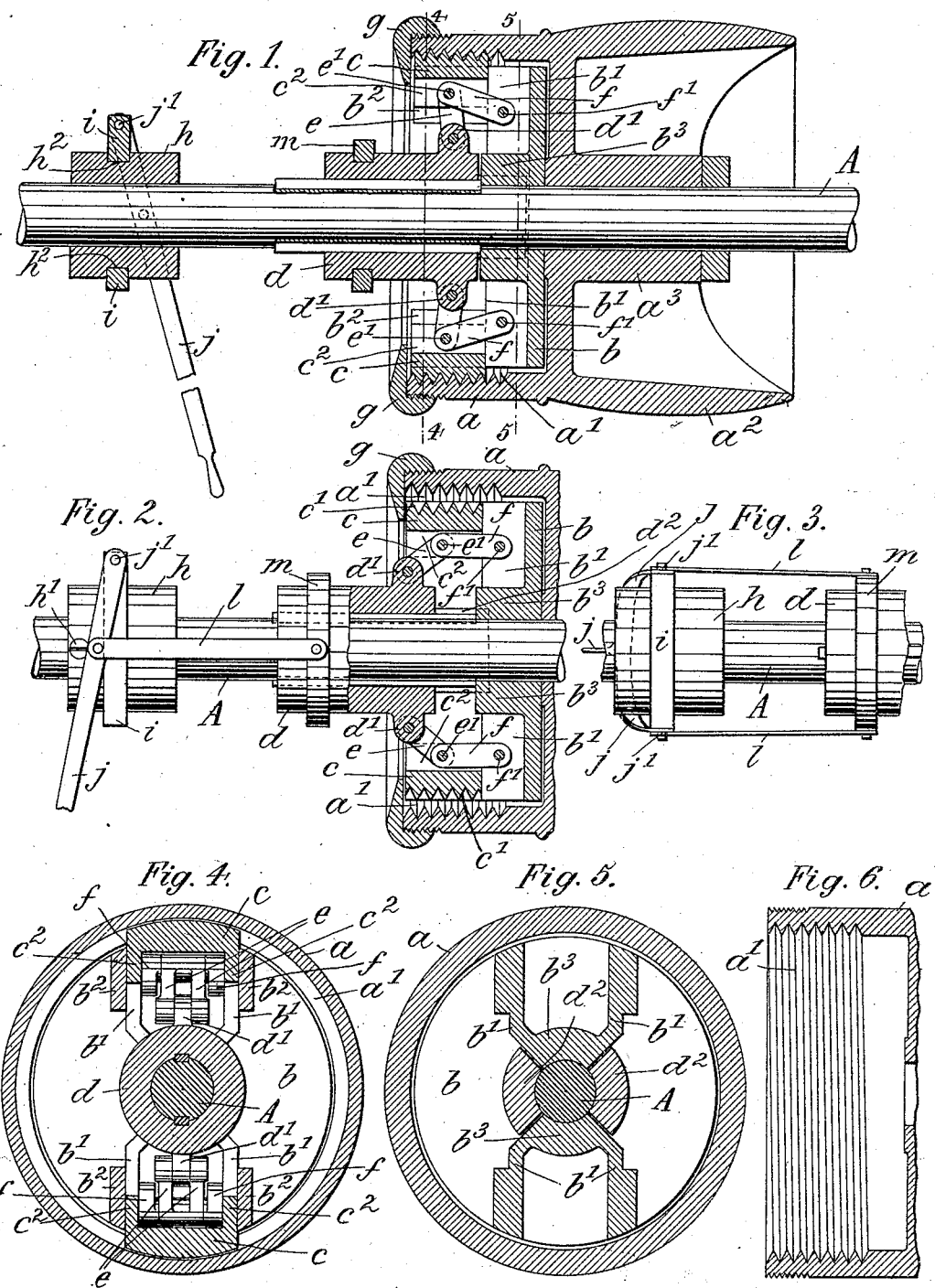

No. 785,353.                                                            Patented March 21, 1905.

UNITED STATES PATENT OFFICE.

JOHN S. EBERT, OF NEW YORK, N. Y.

CLUTCH.

SPECIFICATION forming part of Letters Patent No. 785,353, dated March 21, 1905.

Application filed July 6, 1904. Serial No. 215,473.

*To all whom it may concern:*

Be it known that I, JOHN S. EBERT, a citizen of the United States, residing at New York city, (Manhattan,) county and State of New York, have invented new and useful Improvements in Clutches, of which the following is a specification.

This invention relates to a clutch which may be readily manipulated during the rotation of either of its members and is not dependent upon friction for effecting the coupling.

In the accompanying drawings, Figure 1 is a longitudinal section of my improved clutch, showing it closed; Fig. 2, a similar section, partly in side view and with part of the pulley broken away, showing the clutch open; Fig. 3, a detail of the clutch-operating mechanism; Fig. 4, a cross-section on line 4 4, Fig. 1; Fig. 5, a similar section on line 5 5, Fig. 1; and Fig. 6, a section through part of the clutch-box.

The letter $a$ represents a clutch-box provided with an interior continuous screw-thread $a'$. The clutch-box $a$ may be made integral with the pulley $a^2$ and has a hub $a^3$, loosely mounted on shaft A. Within the clutch-box $a$ is contained a disk $b$, having two pair of rails $b'$, flanked by guides $b^2$. Between these guides there are slidably fitted upon the rails $b'$ a pair of radially-movable clutch-jaws $c$, the outer faces of which are threaded, as at $c'$, to engage thread $a'$ of box $a$. To operate the jaws $c$, I mount upon shaft A a slidable sleeve $d$, which is held against independent rotation by groove-and-feather connection. To lugs $d'$ of sleeve $d$ are pivoted the inner ends of U-shaped links $e$, the outer ends of which are pivoted to flanges $c^2$ of jaws $c$ at $e'$. Upon pivots $e'$ further turn the outer ends of U-shaped links $f$, the inner ends of which are fulcrumed at $f'$ to the rails $b'$ of disk $b$. In this way the jaws $c$ are connected to the sleeve $d$ as well as to the disk $b$. It will be seen that if the sleeve $d$ is moved to the right, Fig. 1, the jaws $c$ will be pushed outward to cause an engagement of the threads $c'$ $a'$ and close the clutch. If the sleeve $d$ is moved to the left, Fig. 2, the jaws will be drawn inward to become disengaged from box $a$ and open the clutch.

The box $a$ is closed by an annular cover $g$, which is screwed to the box and projects inwardly over jaws $c$. Thus when the clutch is closed a rotation of pulley $a^2$ in one direction will tend to screw the jaws $c$ against lid $g$, while if the pulley is rotated in the opposite direction the jaws will be screwed against rails $b'$. Thus in either case a positive engagement of the two members of the clutch not depending upon friction is effected.

The right-hand end of sleeve $d$ is notched to form a pair of claws $d^2$, that straddle a notched hub $b^3$ of disk $b$, Fig. 5. The length of the claws $d^2$ should be greater than the stroke of sleeve $d$, so that the sleeve always positively engages the disk. In this way the links $e$ $f$ will be relieved from strain.

In order to operate sleeve $d$, I secure to shaft $a$ by screw $h'$ or otherwise a collar $h$, having a peripheral groove $h^2$. Within this groove is seated a yoke $i$, to which is fulcrumed at $j''$ a forked shipping-lever $j$. Links $l$ $l$ connect lever $j$ to a ring $m$, sunk into the periphery of sleeve $d$. The lever $j$ will, owing to its weight, hang downward, and will therefore not be taken along by the rotation of shaft A. In this way the yoke $i$ and ring $m$ will also remain at rest during the rotation of the shaft. By swinging the lever in one or the other direction the jaws $c$ will be opened or closed and in this way the clutch may be operated without the use of a separate stand.

It will be seen that my improved clutch is operated by interlocking the threaded jaws $c$ with the threaded box $a$ or disengaging them therefrom and is not dependent upon frictional contact between these parts. Consequently the clutch may be operated with a small expenditure of power even if the shaft is heavily loaded.

What I claim is—

1. A clutch composed of a threaded box, an inclosed disk having rails and guides, radially-movable threaded jaws engaging the same, a slidable collar, and pivoted links connecting said collar to the jaws, substantially as specified.

2. A clutch composed of a threaded box, an inclosed disk having rails and guides, radially-movable threaded jaws engaging the same, a slidable collar, pivoted links connecting the collar to the jaws, and pivoted links connecting the jaws to the disk, substantially as specified.

3. A clutch composed of a threaded box, an inclosed disk having guides and a notched hub, radially-movable threaded jaws engaging the guides, a slidable sleeve having claws that engage the notched hub, and pivoted links that connect the sleeve to the jaws, substantially as specified.

4. In a clutch, a collar, a yoke engaging the same, a shipping-lever pivoted to the yoke, a ring connected to the shipping-lever, a grooved slidable sleeve upon which the ring is seated, threaded radially-movable jaws, pivoted links for connecting the sleeve to the jaws, and a threaded box engaged by the jaws, substantially as specified.

Signed by me at New York city, (Manhattan,) New York, this 5th day of July, 1904.

JOHN S. EBERT.

Witnesses:
  WILLIAM SCHULZ,
  FRANK V. BRIESEN.